March 25, 1930.  A. E. THORNLEY  1,752,279
STUFFING BOX
Filed May 12, 1927
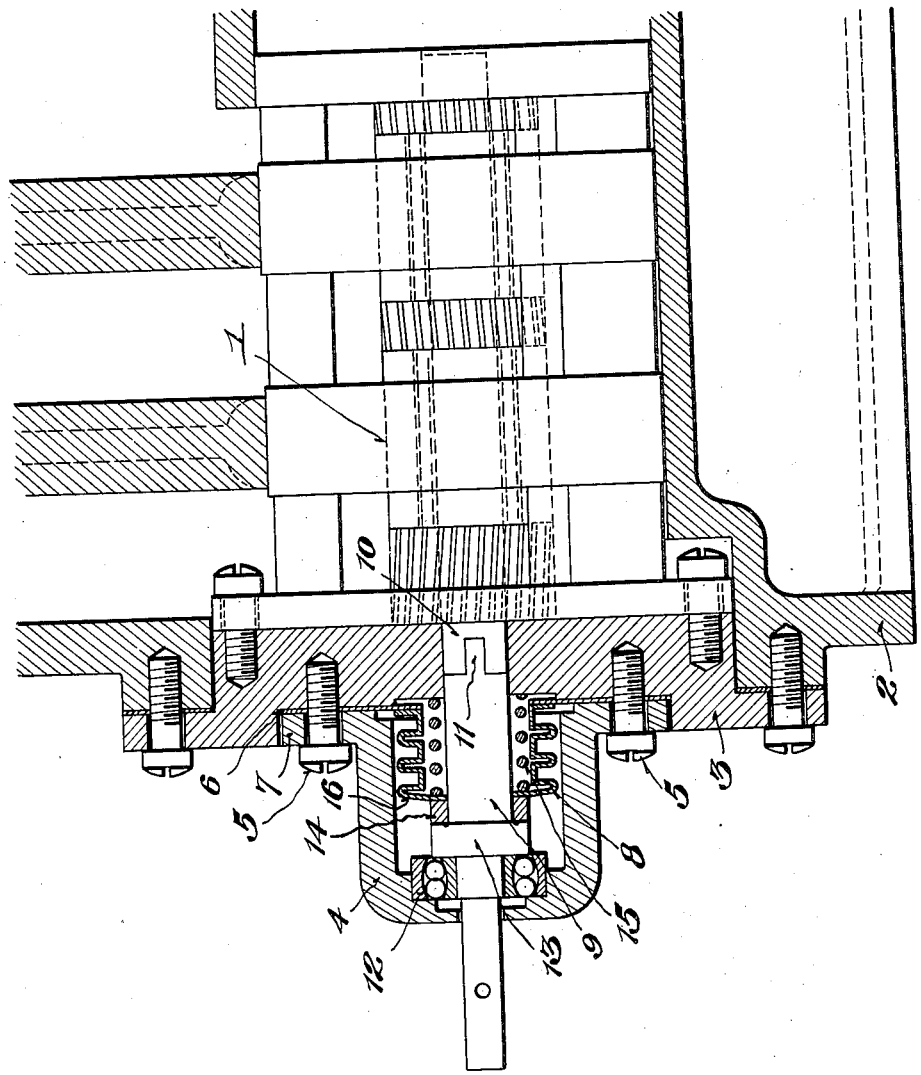
INVENTOR.
Albert E. Thornley
BY Joseph A. Miller
ATTORNEY.

Patented Mar. 25, 1930

1,752,279

UNITED STATES PATENT OFFICE

ALBERT E. THORNLEY, OF PAWTUCKET, RHODE ISLAND, ASSIGNOR TO NARRAGANSETT MACHINE COMPANY, OF PAWTUCKET, RHODE ISLAND

STUFFING BOX

Application filed May 12, 1927. Serial No. 190,776.

This invention relates to certain new and useful improvements in stuffing boxes and is particularly designed for use with compressors or rotary gear pumps used in conjunction with refrigerating machines.

The primary object of the invention is to provide a stuffing box for use with a machine of this type, wherein the shaft is divided and the stuffing box likewise divided so that in event of wear or leakage, the outer stuffing box section can be removed and replaced without disturbing the remainder of the machine.

The invention further aims to provide novel means for preventing escape of the gases and wherein the pressure of the gases is utilized in sealing the parts so as to prevent escape thereof.

In the drawings:—

The figure is a vertical sectional view of the invention.

In proceeding in accordance with the present invention, a compressor or rotary gear pump 1 is shown and which has a casing 2, the latter having a front plate 3 provided with a demountable cap 4. The cap 4 is held in position by means of the bolts 5 so as to be readily removable. A washer 6 is disposed between the front plate 3 and the flanged base 7 of the cap and extends in front of and abuts and seals one end of a bellows 8, the latter surrounding the outer section 9 of the compressor or pump drive shaft 10. Tongue and groove or other slip joint connection 11 is formed between the shaft sections 9 and 10 so that same may be readily connected and disconnected by a relative sliding of the shaft section 9. A thrust bearing 12 for the shaft section 9 is carried by the cap 4 and is engaged by a thrust collar 13 on the shaft section 9. A packing ring or washer 14 closely fits the shaft section 9 and engages the thrust collar 13, being forced into engagement with the latter by the bellows 8 and by means of a coil spring 15 which latter surrounds the shaft section 9 and is disposed within the bellows 8. One end of the spring 15 engages the head 16 of the bellows, while the other end thereof engages the front plate 3 of the compressor.

From the foregoing, it will be seen that the spring and also the bellows, which latter is subjected to the pressure of the gases, will force the packing washer 14 against the thrust collar 13 and the latter in turn will be forced against thrust bearing 12, so that an effectual seal is afforded. If it is necessary, upon wear or leakage, or for any other purpose, to replace any part or parts, it is merely necessary to remove the bolts 5 whereupon the entire structure can be removed and repairs or replacement or inspection easily had.

Having thus described my invention what I claim as new and desire to secure by Letters Patent is:—

1. In a stuffing box for pumps or the like, a casing, a demountable cap carried by a wall of the casing, a washer disposed between the casing and cap, a sectional shaft having a slip-joint between its sections and having one of its sections carried by the cap so as to be removable from the other section upon removal of the cap, a thrust means on said first named section a bellows surrounding said first named section and abutting the thrust means and washer, and a coil spring disposed within the bellows and surrounding the first named shaft section and having one end abutting the outer end of the bellows, the opposite end of the spring engaging said wall of the casing whereby upon removal of the cap the first named shaft section, the thrust means, the bellows and spring will be removed as a unit with the cap and said first named shaft section.

2. In a stuffing box for pumps or the like, a casing, a demountable cap carried by a wall of the casing, a sectional shaft having a slip-joint between its sections and having one of its sections carried by the cap so as to be re movable from the other section upon removal of the cap, thrust means on said shaft section, and packing means between the thrust means and said wall of the casing and being mounted on said first named shaft section and having abutting engagement with said wall of the casing so as to be removable and replaceable as a unit with said first named shaft section and the cap upon removal or replacement of the cap.

In testimony whereof I have signed my name to this specification.

ALBERT E. THORNLEY.